(12) United States Patent  
Cole (10) Patent No.: US 7,221,259 B2
(45) Date of Patent: May 22, 2007

(54) ELECTRONIC LABEL INTERROGATION THROUGH INCIDENTAL ELECTROMAGNETIC RADIATION

(75) Inventor: Peter Harold Cole, West Lakes Shores (AU)

(73) Assignee: Tagsys Australia Pty. Ltd., Adelaide (AU)

( * ) Notice: Subject to any disclaimer, the term of this patent is extended or adjusted under 35 U.S.C. 154(b) by 210 days.

(21) Appl. No.: 10/833,701

(22) Filed: Apr. 27, 2004

(65) Prior Publication Data

US 2004/0201456 A1 Oct. 14, 2004

(30) Foreign Application Priority Data

Oct. 29, 2001 (AU) ................................ PR8505
Oct. 21, 2002 (WO) ................... PCT/AU02/01432

(51) Int. Cl.
*H04Q 5/22* (2006.01)
(52) U.S. Cl. ............... 340/10.2; 340/10.1; 340/10.3; 340/10.4; 340/10.5; 340/10.31; 340/825.69; 340/825.72; 340/10.41
(58) Field of Classification Search ........... 340/10.2, 340/10.1, 10.3, 10.4, 10.5, 10.31, 825.69, 340/825.72, 10.41
See application file for complete search history.

(56) References Cited

U.S. PATENT DOCUMENTS

| 4,063,229 A | 12/1977 | Welsh et al. |
| 4,623,890 A | 11/1986 | Nysen |
| 4,973,911 A * | 11/1990 | Marshall ................ 324/628 |
| 5,300,875 A * | 4/1994 | Tuttle .................... 320/138 |
| 5,416,486 A | 5/1995 | Koert et al. |
| 5,457,447 A | 10/1995 | Ghaem et al. |
| 5,613,228 A * | 3/1997 | Tuttle et al. ............ 455/127.2 |
| 6,034,603 A | 3/2000 | Steeves |
| 6,046,683 A * | 4/2000 | Pidwerbetsky et al. .... 340/10.4 |
| 6,122,329 A * | 9/2000 | Zai et al. ................ 375/329 |
| 6,177,870 B1 * | 1/2001 | Lian et al. ............... 340/572.5 |
| 6,356,623 B1 * | 3/2002 | Le Van Suu ............. 379/24 |
| 6,411,212 B1 | 6/2002 | Hecht et al. |
| 6,980,084 B1 * | 12/2005 | Yones ..................... 340/10.34 |
| 2005/0127177 A1 * | 6/2005 | Dearing et al. ......... 235/385 |

FOREIGN PATENT DOCUMENTS

| DE | 198 32 628 A1 | 2/2000 |
| NL | 9500397 A | 3/1995 |
| WO | WO 01/41043 A1 | 6/2001 |

OTHER PUBLICATIONS

F. Schmidt et al., "CO2.2 Versatile System For Remote SAW Sensor Applications", *Sensor 95 Kongressband*, 1995, pp. 539-542, Siemens AG, Munich, Germany.

* cited by examiner

*Primary Examiner*—Brian Zimmerman
*Assistant Examiner*—Vernal Brown
(74) *Attorney, Agent, or Firm*—Inskeep IP Group, Inc.

(57) ABSTRACT

A system for electromagnetically interrogating electronically coded labels is provided. The system includes at least one electromagnetically interrogatable electronic coded label, an interrogator containing a generator of electromagnetic interrogation signals and a receiver of electromagnetic reply signals from the label. The system is adapted to make use of electromagnetic signals, other than those generated by the interrogator, which may reach the label.

6 Claims, 8 Drawing Sheets

ELECTRONIC LABEL INTERROGATION THROUGH INCIDENTAL ELECTROMAGNETIC RADIATION

CROSS REFERENCE TO RELATED APPLICATIONS

This application is related to Australian Application Number PR8505 filed on Oct. 29, 2001 entitled Electronic Label Interrogation Through Incidental Electromagnetic Radiation; and PCT application number PCT/AU02/01432 filed on Oct. 21, 2002 entitled, Electronic Label Interrogation Through Incidental Electromagnetic Radiation, and claims priority therefrom.

BACKGROUND OF THE INVENTION

The present invention relates to personnel or item management, or warehouse or transportation logistics, wherein electromagnetically interrogatable electronic coded labels attached to personnel or objects transmit data to or receive data from an interrogation system by means of electromagnetic waves.

Frequently such systems operate in regions in which other users of the electromagnetic spectrum also generate electromagnetic waves for related or unrelated purposes.

With increasing crowding of the electromagnetic spectrum, and a modern tendency of regulators to encourage re-use of spectrum by different users, there is generally a considerable amount of electromagnetic radiation in any region occupied by electronically coded labels. When used for communication, this radiation is often at a significant level to achieve long range, possibly in unfavorable propagation contexts, or to overcome noise. Although subject to regulation, this radiation is often at a particularly significant level close to its source. However, only a small part of such radiation reaches an intended receiver. Most is dissipated in objects other than the intended receiver or travels unimpeded to indefinitely far regions of space.

Passive electromagnetically interrogated electronically coded labels generally need to obtain their operating power from an electromagnetic wave. That power can come from a range of sources. Generally it is provided as an interrogation illumination signal specifically generated by an interrogator for this purpose.

However labels can be designed to receive operating power, either in whole or in part, from other sources such as the radiation first mentioned herein. This can be achieved without significant change to the power which those other sources provide to their intended receivers.

It is also true that such other sources can provide interfering signals to receivers of electronic label interrogators. With care, the operating frequency and waveforms of electronic label interrogators can be adjusted so that they combine with electromagnetic signals introduced for other purposes, to enhance the operating power available to electromagnetically interrogatable electronic coded labels. Alternatively or in addition, the signals from electronic label interrogators can be adjusted so as to avoid interference, within the receivers of such interrogators, to extraneous signal sources to which interrogator systems are exposed.

It would be particularly advantageous if both objectives could be simultaneously achieved. It will be shown herein that it is possible to do so.

Figure 1:
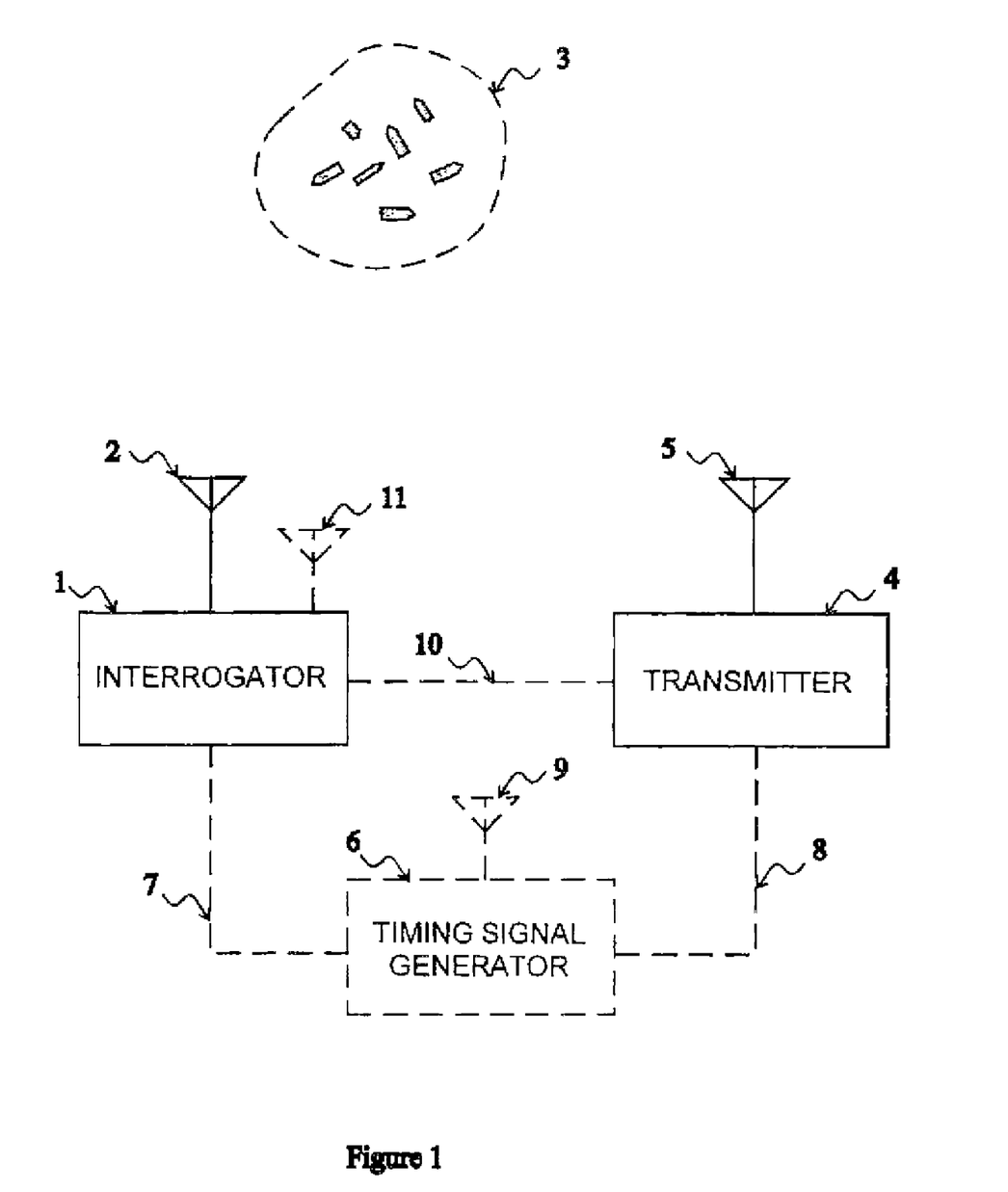
FIG. 1 shows an electronic coded label interrogation system and an incidental electromagnetic field generation system.

An illustration of a multi-faceted electromagnetic communication situation is provided in FIG. 1, wherein a label interrogator 1 transmits through interrogation antenna 2, electromagnetic signals to a group of electronic coded labels 3 which may return information bearing reply signals to the interrogator through the same antenna 2 or a different antenna. The figure illustrates that transmitter 4 of a data link which operates in the vicinity of the interrogator may radiate, through data link antenna 5, an electromagnetic signal which may in part also illuminate the region occupied by labels 3.

The interrogator 1 of FIG. 1 may also be fitted with a signal sensing antenna 11 which assists the interrogator in its determination of what other electromagnetic signals may be present in its vicinity.

For precise control of signals generated by the interrogator 1 or the data link transmitter 4, the system may make use of a low noise oscillator or timing signal generator 6 conveying its signals to the signal sources 1 and 4 via connecting cables 7 and 8, or via electromagnetic waves launched by antenna 9.

In addition data or command signals may flow between the interrogator 1 and the data link 4 via signal path 10 which may be wired or electromagnetic.

Many principles of remote interrogation and programming of electromagnetically coded labels are described in the disclosures of PCT/AU90/00043, PCT/AU92/00143, PCT/AU92/00477, PCT/AU97/00428, PCT/AU98/00017, PCT/AU97/00385 and PCT/AU99/01165, the disclosures of which are incorporated herein by cross reference.

In operation of electronic label interrogation systems according to the prior art it is usual practice to seek to operate in regions of an electromagnetic spectrum unoccupied by other users. This is particularly true in systems which make use of passive labels, from which replies reaching a receiver are particularly weak as a result of two way propagation loss between interrogator and label, and energy conversion loss in the label.

In the prior art a principal factor which restricts interrogation range of a passive labelling system is a difficulty of developing, at a distance, sufficient radio frequency voltage at a rectifier element within the coded label for that rectifier to operate efficiently.

In the present invention, both limitations just mentioned are reduced when behaviour of the interrogator is adapted in relation to other electromagnetic propagation signals which may reach the coded labels or the interrogator receiver, so that label rectifier voltage is enhanced, or the interrogator receiver interfering signals are reduced.

Such adaptation may be possible because the interrogator may be supplied with information about other signals by being told characteristics of other signal sources in the region of an interrogator. Such characteristics may include: frequency; spectrum; power level; antenna positioning, orientation, and pattern; and frequency hopping if applicable. The interrogator may alternatively make its own measurements of adjacent extraneous electromagnetic fields.

An interrogator may share hardware with another system of independent function, for example there may be a common transmitting antenna between an interrogation system and the transmitter of a communication system.

There may be a common low-noise master oscillator when phase coherence between an interrogator transmitter signal and a transmitter signal of another system is important.

The interrogator signal may be arranged to form a particular spatial interference pattern with the transmitter signal of another system, or another signal from another antenna of the same or different interrogator. In such cases the phase and frequency relations between signals become important. The time for which coherent operation lasts also becomes important.

It may be advantageous to exploit fortuitous reflections from an object in creating useful interference patterns. Signals from an interrogator or from other systems may be reflected.

In frequency hopping systems, diagnosing and adopting the same hopping pattern, possibly with a frequency offset, as is being used by other systems, and using a phase coherent carrier, is a good way of ensuring a positive reinforcement of transmitter signals and simultaneous minimisation of interfering signals in the receiver. Such cooperating signals can be from two interrogators, or an interrogator and a communication system.

BRIEF DESCRIPTION OF THE INVENTION

In one embodiment of the present invention, it is possible to design a frequency hopping interrogator which will operate independently when alone, but which will cooperate in a hopping pattern with another interrogator when it senses or is otherwise told that there is another strong signal generated in the vicinity of the labels.

Cooperating with another signal generation system may include avoiding or adopting that other generation system's frequencies.

Sometimes signals may be usefully modulated so that their peak power exceeds the average.

In various embodiments of the present invention, when the interrogator is adapted to determine what other electromagnetic signals are present in its environment, it can be designed to detect:
  other carrier frequencies in use;
  modulation of those carrier frequencies;
  any hopping sequence which they may follow;
  direction of propagation of such extraneous signals; or
  amplitude and phase, at a particular point, of those signals.

Such an interrogator may also detect:
  a low phase noise reference signal; or
  a signal defining a sequence to be used in frequency hopping.

Such an interrogator may also generate the above signals, and in addition may radiate them to other equipment using either near-field or far-field frequencies.

Based on the signals detected, such an interrogator may be adapted to vary its own signalling so as to reap the benefits of cooperation with other radiation sources, and to adjust its own interrogation carrier frequency, phase, hopping pattern so as to maximise voltages fed to rectifier systems of passive labels, or to achieve avoidance of noise in the receiver of an interrogator, or both.

One policy which may be followed with advantage is for the interrogator to maintain a constant frequency offset from one or more temporarily unmodulated carrier signals of data links operating in the vicinity.

When considering how signals may usefully be combined a number of possibilities may be identified as listed below.

Signals may be of the same frequency, and in phase. For two signals, in a rectifying system, there is an effective 6.02 dB power gain, for three signals 9.54 dB gain, and for four signals 12.04 dB gain. Effective range can be increased by factors of 2, 3 and 4 respectively.

Signals may have a distinct frequency offset, more than the offset present in label reply sidebands. As an example, a 1 MHz offset in a uhf backscatter system employing a reply sub-carrier of 500 kHz would be advantageous. This situation may complicate signalling of command signals to the tag, but may fill in holes in the powering field, as there cannot then be regions of a sustained out of phase relation.

In a frequency hopping system one signal might eschew the lowest available frequency, and the other the highest available frequency.

Signalling to the label might be achieved by momentarily cutting out one signal. The result would be a sharp reduction in effective excitation power, and an extinguishment of the 1 MHz mixing product in the rectifier.

It may be that a data link, when not carrying data, emits a pure unmodulated carrier rather than no signal.

Such a data link can be operated usefully in an interleaved mode with an interrogator, and can employ the same frequency, and could carry the interrogator stored label data to a distant station, during periods of no interrogation, and could in its quiescent (unmodulated but carrier present) mode supply a useful auxiliary signal.

If it is desirable to avoid holes in the interrogation field, it may be possible to use a common antenna for the interrogator and data link. Such an antenna may under certain regulations have two input points and gain of 6 dB from each input point.

In one embodiment of the present invention, an appropriate frequency offset may keep another carriers phase noise away from the receiver channel of the interrogator.

In another embodiment of the present invention, in which electromagnetic compatibility regulations require that backscatter interrogation systems and other communication systems occupy different channels of a regulated band, there is an advantage when the backscatter system is adapted to occupy a channel adjacent to a communication channel, and the backscatter reply sidebands are generated at a frequency that is distinct or well separated from the sidebands unavoidably generated by mixing within the labels of the carrier signals of the communication system and the backscatter system.

In a passive backscatter label system in which reply signals are modulated on a reply sub-carrier, an offset of zero or twice the reply sub-carrier frequency is appropriate.

In one embodiment of the present invention, the labels are adapted to operate, even if at reduced range, when only the interrogation signal is present.

According to the present invention there is provided a system for electromagnetically interrogating electronically coded labels including:
  at least one electromagnetically interrogatable electronic coded label; and
  an interrogator containing a generator of electromagnetic interrogation signals and a receiver of electromagnetic reply signals from said label;
  wherein said system is adapted to make use of electromagnetic signals, other than those generated by said interrogator, which reach said label.

BRIEF DESCRIPTION OF THE DRAWINGS

Preferred embodiments of the present invention will now be described with reference to the accompanying drawings wherein.

DETAILED DESCRIPTION OF THE INVENTION

An illustration of the basic features of the invention is provided in FIG. 1, wherein a label interrogator 1 transmits through interrogation antenna 2, interrogation electromagnetic signals to a group of electronic coded labels 3 which may return information bearing reply signals to the interrogator through the same antenna 2 or a different antenna. The figure illustrates that the transmitter 4 of a data link which operates in the vicinity of the interrogator may radiate through data link antenna 5 an electromagnetic signal which may in part also illuminate the region occupied by labels 3.

The interrogator 1 of FIG. 1 may also be fitted with a signal sensing antenna 11 which assists the interrogator in its determination of what other electromagnetic signals may be present in its vicinity.

In a further embodiment of the invention, for precise control of signals generated by the interrogator 1 or data link transmitter 4, the system may make use of a low noise oscillator or timing signal generator 6 reticulating its signals to the signal sources 1 and 4 via connecting cables 7 and 8, or via electromagnetic waves launched by antenna 9.

In addition data or command signals may flow between the interrogator 1 and the data link 4 via signal path 10 which may be wired or electromagnetic.

Figure 2:
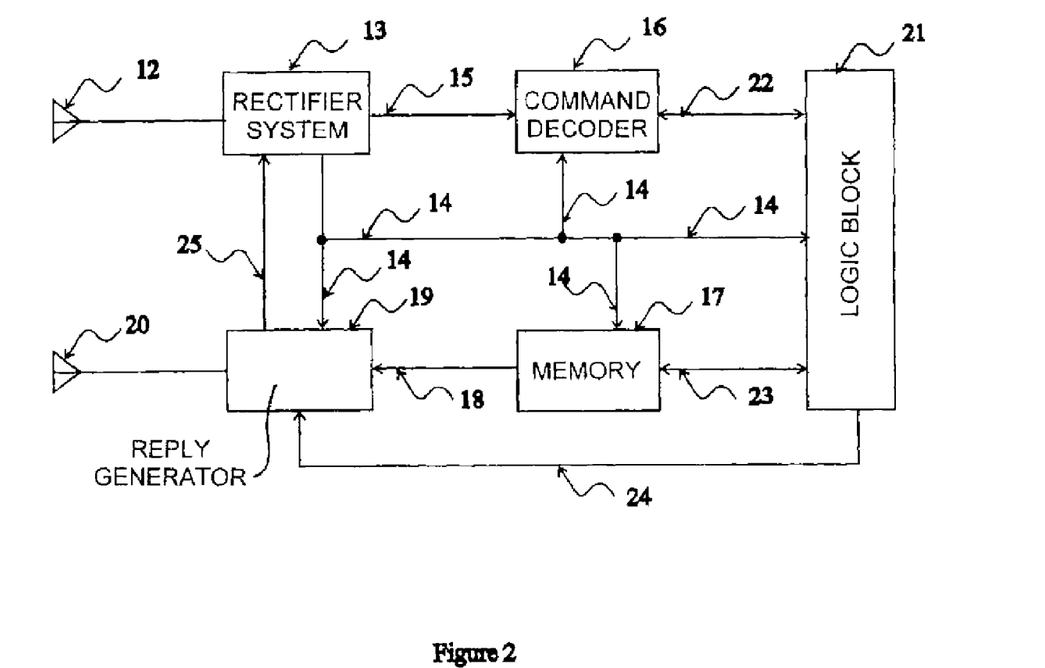
FIG. 2 is a block diagram of an electronic coded label.

FIG. 2 shows a block diagram of an electronic coded label wherein a label receiver antenna 12 carries signals to a rectifier system 13, the output of which provides d.c. power via connection 14 to most other sub-blocks, and also provides a possibly modulated output signal via connection 15 to a command decoder 16. Reply signals from the label originate in memory 17 from which data is conveyed via connection 18 to reply generator 19 and to reply antenna 20, which may be distinct from or the same as label receiver antenna 12.

Operations within the label are generally controlled by logic block 21 which communicates via connections 22, 23 and 24 with the command decoder, memory, and reply generator. When the label operates by the principle of modulated backscatter, the reply generation process may be via modulation of the rectifier block 14 and may occur via connection 25 whereby impedance properties of the rectifier block 13 presented to the single antenna are varied.

Crucial in the operation of such an electronic label is the task of obtaining sufficient operating voltage from the rectifier section for reliable operation of other circuits. Since the antenna 12 will receive all electromagnetic signals in the region where the label is placed, it is desirable to arrange, to the extent possible by the management of the frequency, phase and the timing characteristics of the signals generated by the interrogator, that the peak voltages of the radio frequency voltage presented to the rectifier system are at the maximum practicable, and that those peaks occur sufficiently frequently in time for development of a usefully sustained output voltage from the rectifier. The present invention should ensure that this occurs.

Figure 3:
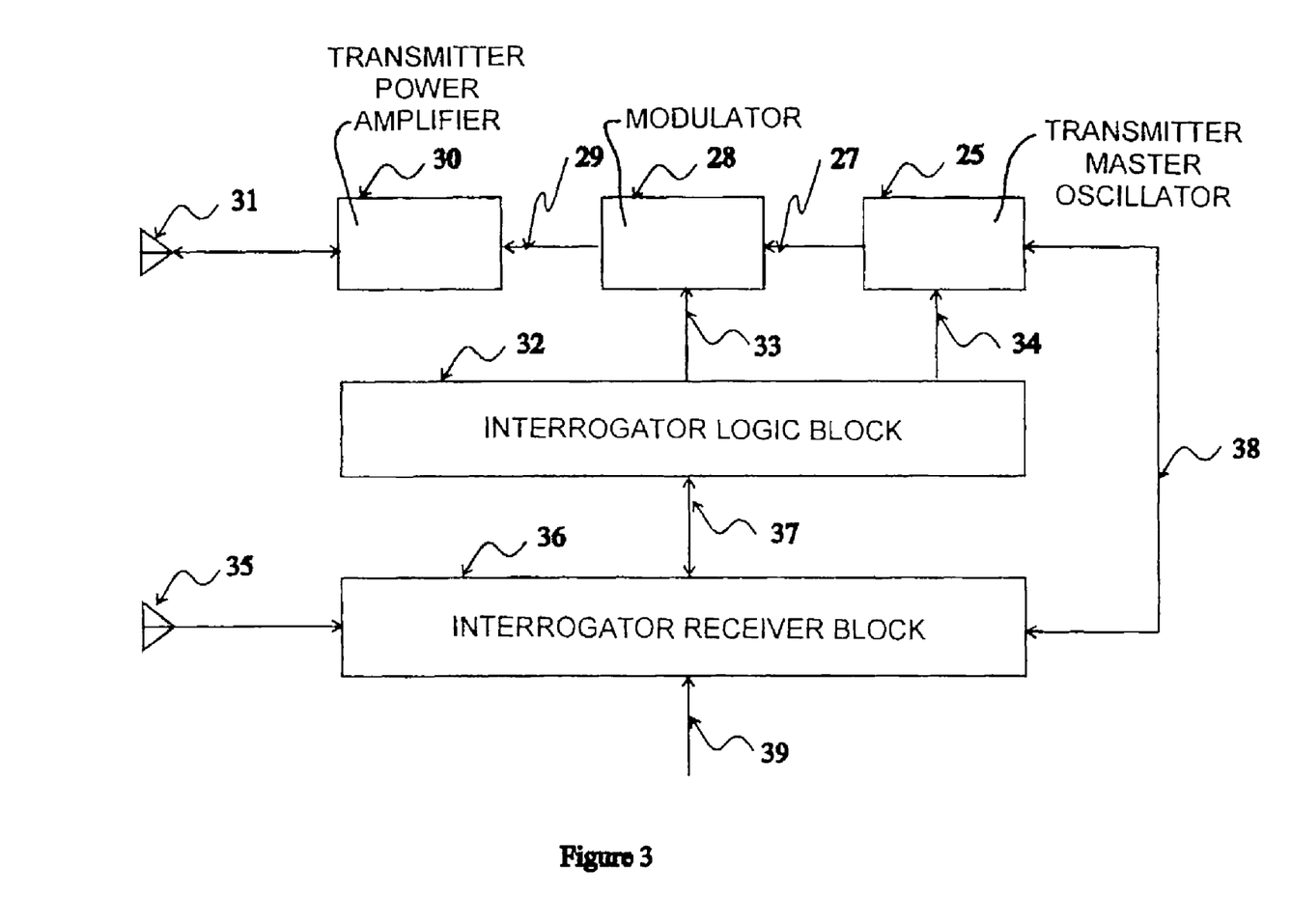
FIG. 3 is a block diagram of an extraneous signal sensing label interrogator.

A block diagram of important features of an interrogator which accomplishes this is shown in FIG. 3. In one mode of its operation suited to interrogation of electronic labels which operate by the principle of modulated backscatter, transmitter signals originate in low phase noise transmitter master oscillator 26, pass via connection 27 to modulator 28 and then via connection 29 to transmitter power amplifier 30 and to transmitter antenna 31. When the interrogator operates without regard to incidental electromagnetic radiation, the interrogation signal emerging from antenna 31 is a low phase noise unmodulated carrier, providing operating power to the label, except when signalling to the label is required, in which case the continuous wave interrogation signal becomes modulated through operation of modulator 28. Such modulation signals are generated within an interrogator logic block 32 and are reticulated to the modulator 28 via connection 33. In some systems signals generated by transmitter master oscillator 26 are varied in a frequency hopping pattern under control of signals originating in the interrogator logic block 32 and conveyed therefrom by connection 34.

In an important embodiment of the invention the interrogator also contains an interrogator receiver antenna 35 which conveys signals to an interrogator receiver block 36 which determines which electromagnetic environmental signals might be present in the vicinity of the interrogator and might be useful in interrogation of a coded label. The receiver block 36 communicates with the logic block 37 and master oscillator 26 via connections 37 and 38 so as to vary the amplitude, phase, frequency or hopping pattern of the interrogator signals so that appropriate reinforcement of label operation from the totality of the signals reaching it occurs. Sometimes the interrogator receiver block may derive reference frequency or timing signals by direct connection 39.

Figure 4:
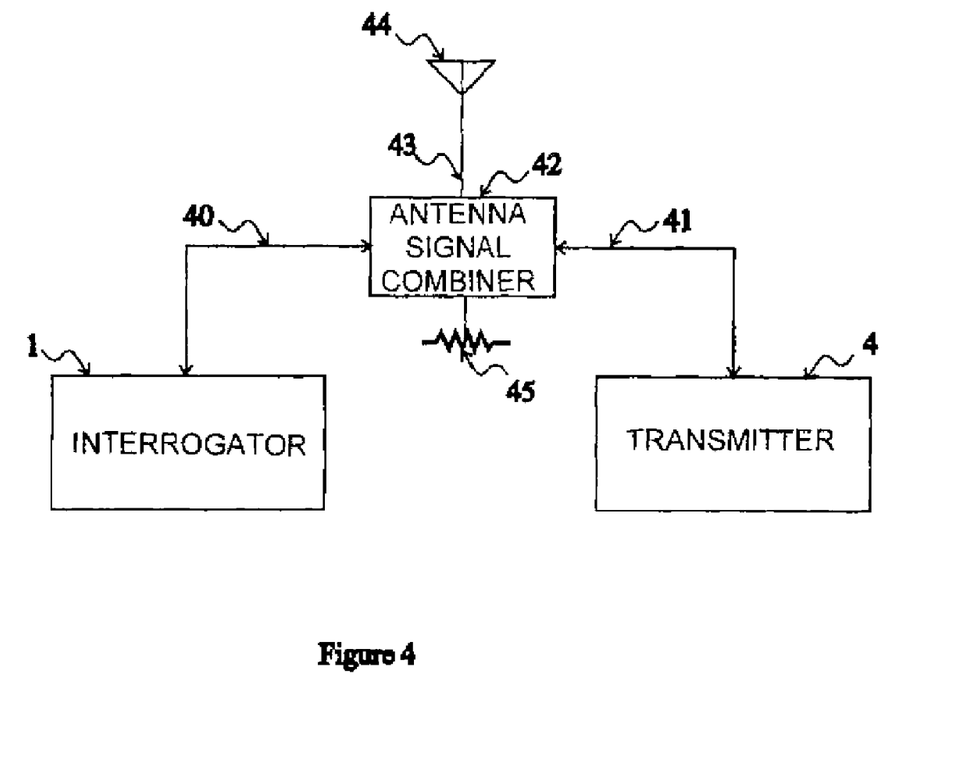
FIG. 4 shows a communication system and a label interrogation system employing a common antenna.

In some situations wherein an interrogator and a data link are approximately co-located, there is economy of manufacture if they share a single antenna. Such an arrangement is shown in FIG. 4 wherein the output of an interrogator 1 and transmitter 4 of a data link convey their signals via connections 40 and 41 to antenna signal combiner 42 which may take the form of a directional coupler. The output of the antenna signal combiner is conveyed by connection 43 to a single antenna system 44. Antenna combiner 42 may, when it is a directional coupler, have a fourth port terminated in termination 45.

An advantage of this configuration is that the cost of separate antennas for the interrogator and data link are saved, and the physical bulk which two separate antennas would require is avoided. When either the data link or the interrogator is not present the unused input to the antenna combiner 42 is simply terminated in a matched load for that port, with no change to the performance of the component remaining.

There is in this configuration the further advantage that the interference pattern between the interrogator signal and the data link signal are more closely predictable.

Figure 5:
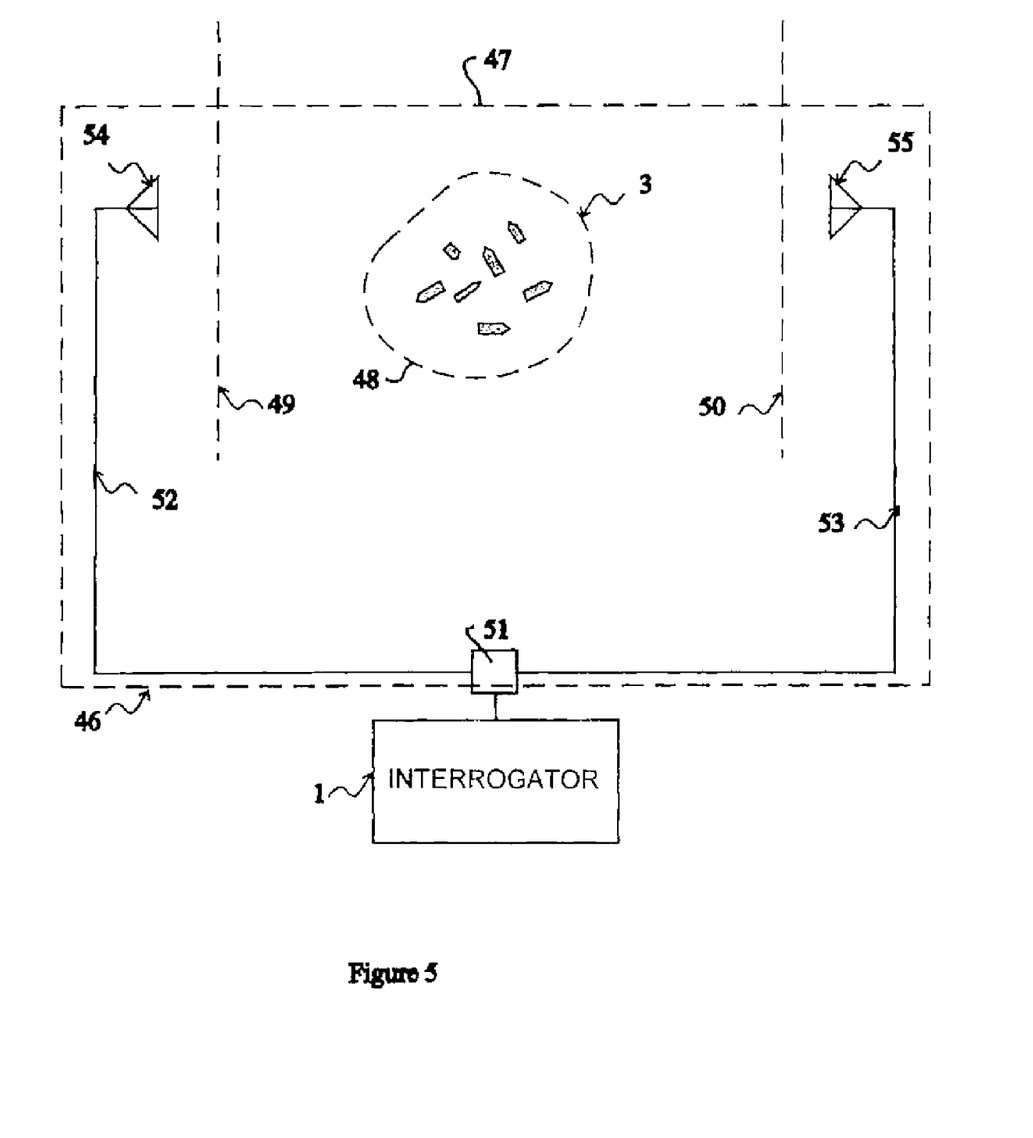
FIG. 5 shows an interrogator with antenna system illuminating a gangway.

A particular design of interrogation antenna which is useful when a large gangway is to be illuminated by interrogation signals is provided in FIG. 5. In this figure the interrogator 1 feeds antenna system 46 which illuminates gangway 47 in which an illuminated region 48 contains a collection of labels 3. Boundaries to the gangway are shown as 49 and 50. The transmitter signal from interrogator 1 is conveyed via splitter 51 and connections 52 and 53 to antenna elements 54 and 55 placed exterior to the boundaries 49 and 50 of illuminated region 48. In a particular embodiment of the invention the antenna system 46 radiates in both directions, but the individual antenna elements may radiate only in their forward direction. Since electromagnetic compatibility testing takes place at test positions outside the illuminated region, it is performed at locations to which only one antenna radiates. However, within the illuminated region both antennas are contributing signals. A desirable interference pattern between such signals, which results in an effective doubling of the amplitude of the electromagnetic field, results.

In a further embodiment of the invention, time-dependent phase shifts may be introduced into connection path 52 or 53 so that the interference pattern does not remain spatially stationary, and all regions of the illuminated region will receive reinforcement at some time. Such time dependent variation of the phase of interfering signals also has merit when an interference pattern is set up between an interrogation signal and an incidental electromagnetic radiation signal, and will be discussed in the next paragraph.

Figure 6:
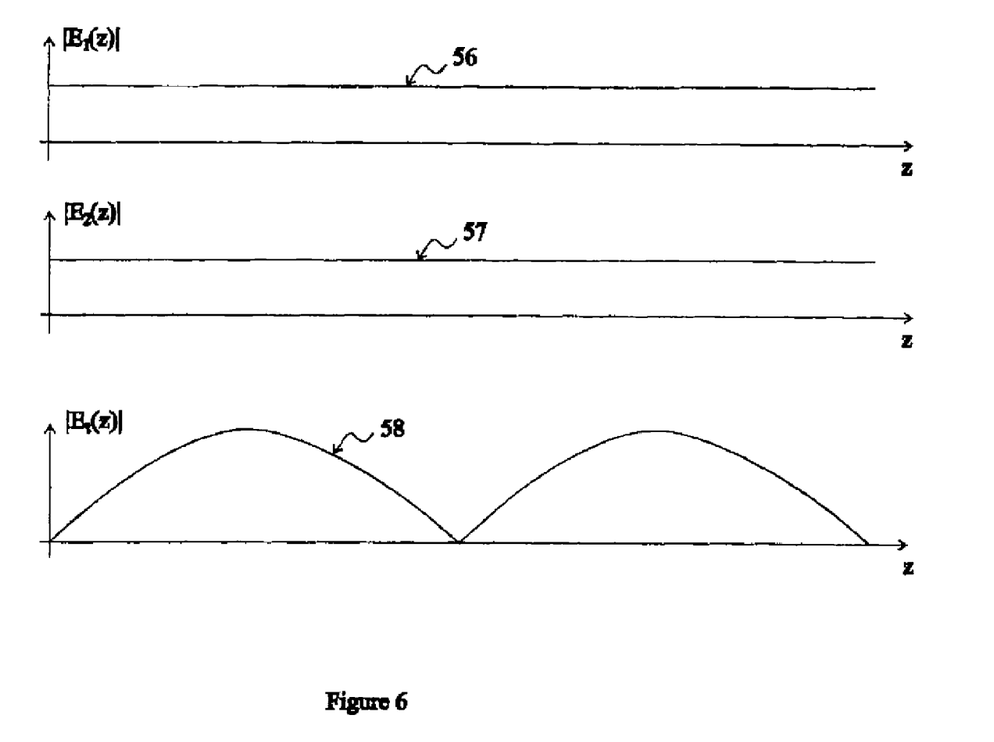
FIG. 6 shows a spatial interference pattern with two signals.

An appropriate interference pattern is illustrated in FIG. 6, which shows the effect when two electromagnetic signals of the same frequency propagate in different directions. The magnitudes $E_1(z)$, $E_2(z)$ of the electric fields of individual uniform plane wave signals are shown as a function of position along a z axis in curves 56 and 57 of the diagram, while the amplitude $E_r(z)$ of the resulting signal is shown in curve 58 therein. It is noted that in regions of constructive interference there is, if the individual signals have the same amplitude, a doubling of the electric field amplitude, and in other regions an extinguishment occurs.

In one embodiment of the invention $E_1(z)$ and $E_2(z)$ may be both interrogation signals while in a different embodiment of this invention signal $E_1(z)$ may be an incidental electromagnetic radiation signal and signal $E_2(z)$ may be an interrogation signal. In a further particular embodiment of this invention, variation of the phase of $E_2(z)$ will cause the region of constructive interference to move, so that all regions along the z axis may be caused to receive, albeit at different times, a relatively strong illumination.

Figure 7:
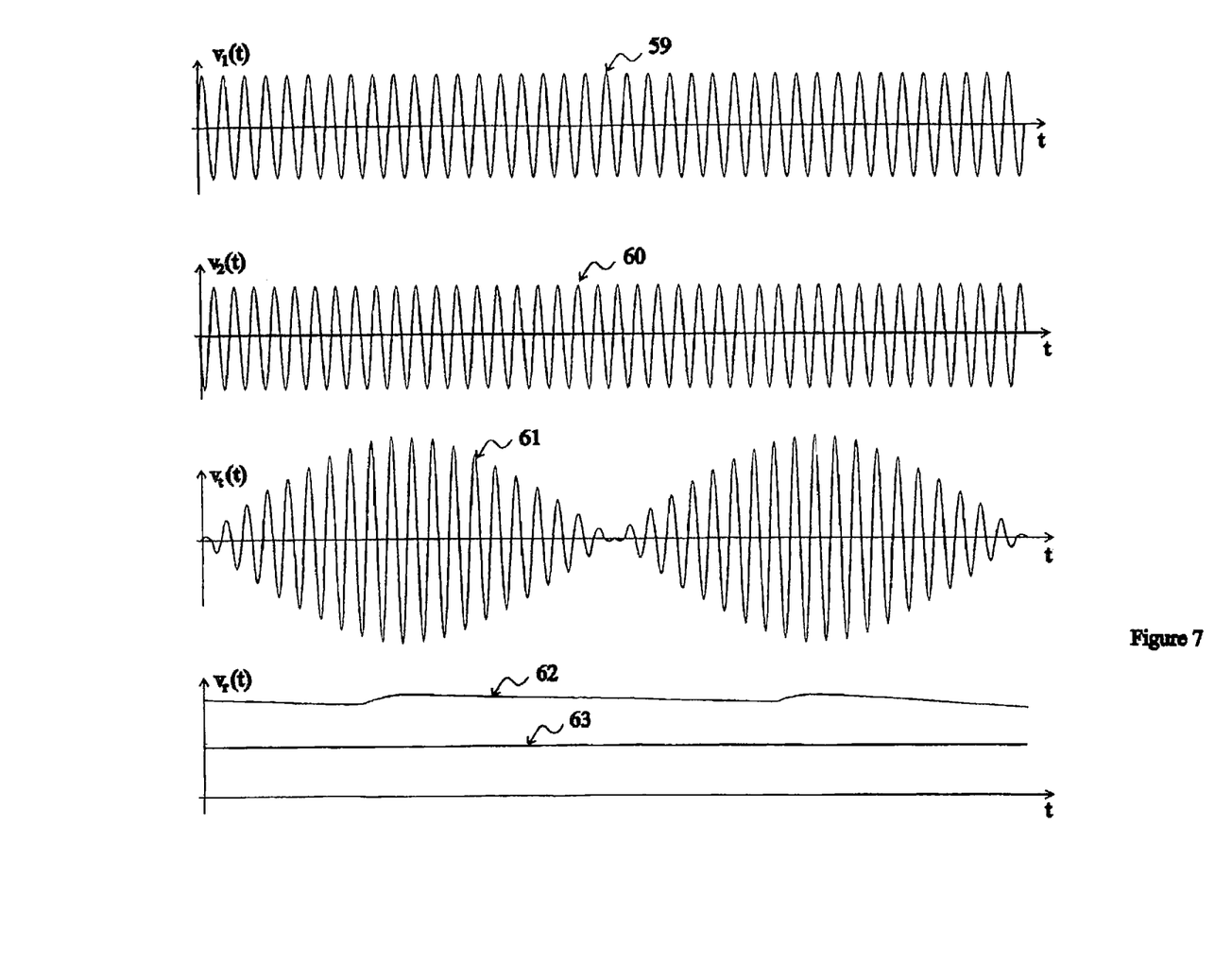
FIG. 7 shows interrogation and extraneous signals and their resultant.

When an incidental electromagnetic radiation signal and an interrogation signal are caused to have different frequencies, the situation can be as illustrated in FIG. 7. In the diagram, waveforms 59 and 60 may represent an incidental electromagnetic radiation signal $v_1(t)$ and a label interrogation signal $v_2(t)$. When the signals are of an equal amplitude but of different frequencies, an interference pattern with total excitation $v_r(t)$, as shown in waveform 61 occurs, from which it is observed that peaks are at some times twice the amplitude of individual excitation signals.

When this waveform is presented within an electronic label to a peak detector rectifier, the output waveform $v_r(t)$ can be as shown in waveform 62, whereas the output voltage from the rectifier when only a single one of the two interfering signals is presented to the rectifier is the lower amplitude signal 63. When two signals are present, the rectifier will also have a perceptible output at the difference frequency between the two signals.

In one embodiment of the present invention that difference frequency output signal may be usefully employed, within the label, as a timing signal regulating operation of circuits within the label. Such timing regulation is of advantage in being able to accurately predict the sub-carrier frequency commonly used to generate reply signals from modulated RF backscatter labels.

Figure 8:
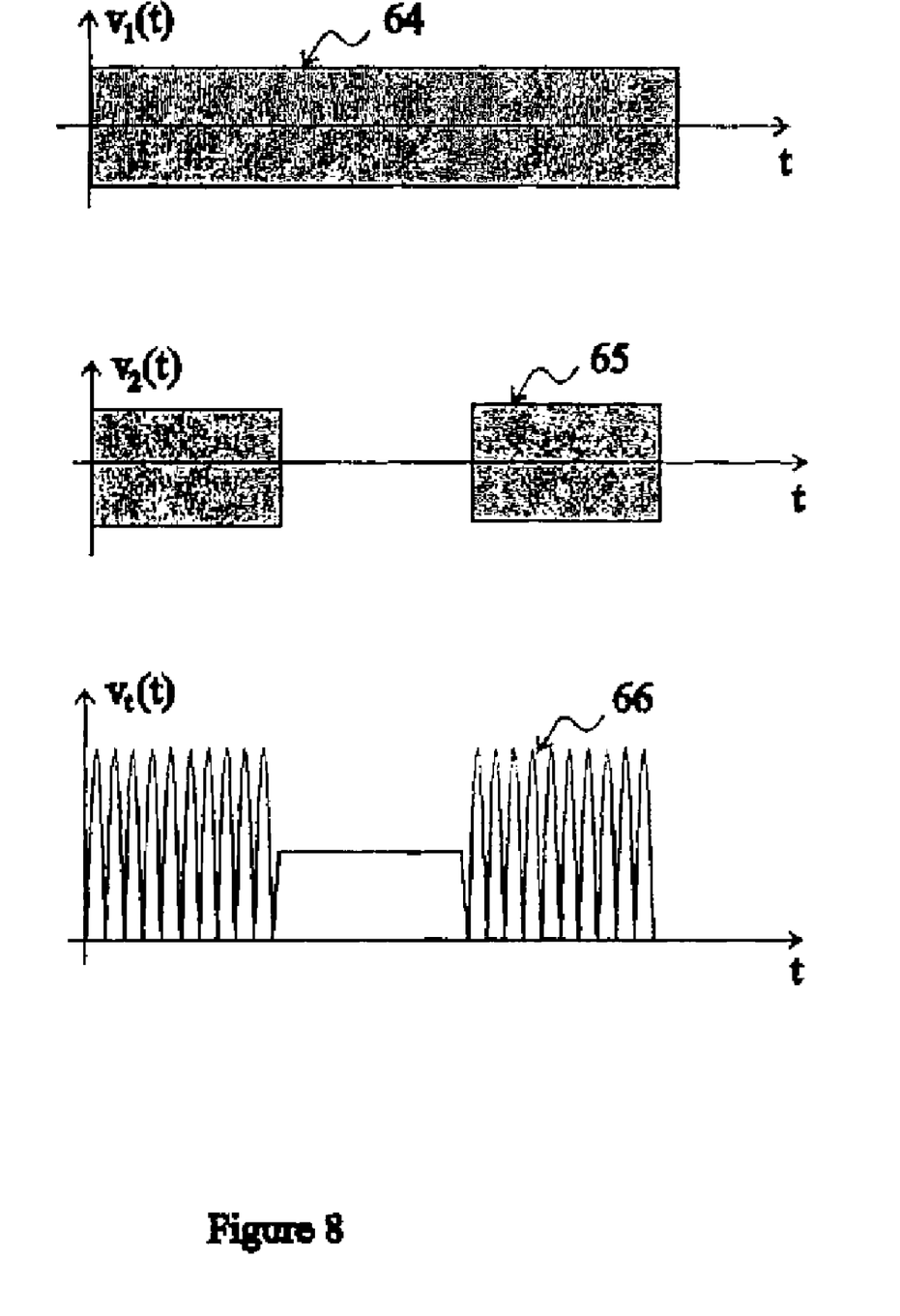
FIG. 8 shows signals presented to a rectifier.

The issues of signalling command signals to such a label in the presence of such interfering signals are illustrated in FIG. 8, to a substantially different time scale to that shown in FIG. 7. In this diagram an incidental electromagnetic radiation signal $v_1(t)$ is illustrated in waveform 64, in which shading has been used to represent rapid oscillations impracticable to represent at this time scale. An amplitude modulated interrogation signal $v_2(t)$, used for both energising the label and for signalling thereto, is represented in the same way in waveform 65. When the frequencies of the two preceding signals are offset by a small amount, the combined signal $v_r(t)$ is as shown in waveform 66. In this embodiment of the invention, the data signals sent from the interrogator to the label may be recovered either from the change in peak value of the total waveform 66 or from the presence or absence, at different times, of the difference frequency in waveform 66.

In a particular embodiment of the invention, when signals 52 and 53 are both interrogation signals, there is an advantage in having them at different frequencies, so that at all points of the scanned region, some field reinforcement occurs, albeit at different times.

In another particular embodiment of the invention, the labels may unavoidably receive sufficient operating power for their own operation simply by being within the pervasive field of another communication system, without there being any need for a transmitted interrogation signal.

In such a case, the field of that other communication system may be modulated for the purpose of carrying data. When this is the case, it is useful for the backscatter labels, already unavoidably powered by the communication system to further modulate and backscatter the signal they receive, most usefully at a higher data rate than the communication system modulation. In this case, the interrogator may receive both the communication system signal and the label backscatter modulation, and use the former as an aid to decoding the latter. A particularly advantageous realisation of this configuration is when the backscatter signal is at a power level lower that the generic signal level below which electromagnetic compatibility regulations do not apply.

Finally, it is to be understood that various alterations, modifications and/or additions may be introduced into the constructions and arrangements of parts previously described without departing from the spirit or ambit of the invention.

What is claimed is:

1. A system for electromagnetically interrogating electronically coded labels, said system comprising:
    an interrogator, said interrogator containing a generator of electromagnetic interrogation signals and a receiver of electromagnetic ambient signals, wherein said ambient signals are not generated by said interrogator;
    at least one electromagnetically interrogatable electronic coded label adapted to receive said interrogation and said ambient signals, said at least one label containing a rectifier for obtaining operating power for said label from said interrogation and said ambient signals;
    wherein said rectifier is adapted to make use of said ambient signals to obtain said power at least when said interrogator is not generating said interrogation signals;
    wherein said ambient signals received by said receiver are used by said interrogator as reference signals in detecting a label reply, and wherein said interrogator includes an antenna system in which some elements contribute to generation of an electromagnetic field at a position of electromagnetic compatibility testing, and a different set of elements generate an electromagnetic field in a region wherein coded labels are located.

2. A system as for electromagnetically interrogating electronically coded labels, said system comprising:

an interrogator, said interrogator containing a generator of electromagnetic interrogation signals and a receiver of electromagnetic ambient signals, wherein said ambient signals are not generated by said interrogator;

at least one electromagnetically interrogatable electronic coded label adapted to receive said interrogation and said ambient signals, said at least one label containing a rectifier for obtaining operating power for said label from said interrogation and said ambient signals;

wherein said rectifier is adapted to make use of said ambient signals to obtain said power at least when said interrogator is not generating said interrogation signals;

wherein said ambient signals received by said receiver are used by said interrogator as reference signals in detecting a label reply, and wherein said at least one label receives sufficient operating power for its operation from a modulated signal of a further communication system, said label further modulating and backscattering the signal that it receives, and said interrogator receives both said modulated signal of said further communication system and said modulated and backscattered signal of said system, and uses said modulated signal of said further communication system as an aid to decoding said modulated and backscattered signal of said further communication system.

3. A method of interrogating an electronically coded label by an interrogator containing a generator of electromagnetic interrogation signals and a receiver of electromagnetic ambient signals, wherein said ambient signals are not generated by said interrogator and wherein said label contains a rectifier for obtaining operating power for said label from said interrogation and said ambient signals, said method including the steps of:

using said ambient signals in said rectifier to obtain said power at least when said interrogator is not generating said interrogation signals; and using said ambient signals received by said receiver in said interrogator as reference signals in detecting a label reply, and wherein said interrogator includes an antenna system in which some elements contribute to generation of an electromagnetic field at a position of electromagnetic compatibility testing, and a different set of elements generate an electromagnetic field in a region wherein a coded label is located.

4. A method of interrogating an electronically coded label by an interrogator containing a generator of electromagnetic interrogation signals and a receiver of electromagnetic ambient signals, wherein said ambient signals are not generated by said interrogator and wherein said label contains a rectifier for obtaining operating power for said label from said interrogation and said ambient signals, said method including the steps of:

using said ambient signals in said rectifier to obtain said power at least when said interrogator is not generating said interrogation signals; and using said ambient signals received by said receiver in said interrogator as reference signals in detecting a label reply, and wherein said label receives sufficient operating power for its operation from a modulated signal of a further communication system, said label further modulating and backscattering the signal that it receives, and said interrogator receives both said modulated signal of said further communication system and said modulated and backscattered signal of said system, and further including the step of using said modulated signal of said further communication system as an aid to decoding said modulated and backscattered signal of said further communication system.

5. A system for electromagnetically interrogating electronically coded labels, said system comprising:

an interrogator, said interrogator containing a generator of electromagnetic interrogation signals and a receiver of electromagnetic ambient signals, wherein said ambient signals are not generated by said interrogator;

at least one electromagnetically interrogatable electronic coded label adapted to receive said interrogation and said ambient signals, said at least one label containing a rectifier for obtaining operating power for said label from said interrogation and said ambient signals;

wherein said at least one label receives sufficient operating power for its operation from a modulated signal of a further communication system, said label further modulating and backscattering the signal that it receives, and said interrogator receives both said modulated signal of said further communication system and said modulated and backscattered signal of said system, and uses said modulated signal of said further communication system as an aid to decoding said modulated and backscattered signal of said further communication system.

6. A system for electromagnetically interrogating electronically coded labels, said system comprising:

an interrogator, said interrogator containing a generator of electromagnetic interrogation signals;

at least one electromagnetically interrogatable electronic coded label adapted to receive said electromagnetic signals, said at least one label containing a rectifier for obtaining operating power for said label from said signals;

wherein said interrogator includes an antenna system in which some elements contribute to generation of an electromagnetic field at a position of electromagnetic compatibility testing, and a different set of elements generate an electromagnetic field in a region wherein coded labels are located.

* * * * *